(12) United States Patent
Hylick et al.

(10) Patent No.: US 8,990,294 B2
(45) Date of Patent: Mar. 24, 2015

(54) FILE SYSTEM OPTIMIZATION BY LOG/METADATA ANALYSIS

(75) Inventors: Anthony N. Hylick, Austin, TX (US); Freeman L. Rawson, III, Austin, TX (US); Joanne P. Rawson, legal representative, Austin, TX (US); Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 13/449,459

(22) Filed: Apr. 18, 2012

(65) Prior Publication Data

US 2013/0282788 A1 Oct. 24, 2013

(51) Int. Cl.
*G06F 15/16* (2006.01)
*G06F 9/46* (2006.01)
*G06F 17/30* (2006.01)
*G06F 9/50* (2006.01)

(52) U.S. Cl.
CPC ........ *G06F 17/30194* (2013.01); *G06F 9/5027* (2013.01)
USPC ........... 709/203; 709/204; 709/206; 718/102; 718/104; 718/106; 707/714; 707/717

(58) Field of Classification Search
CPC ... G06F 9/5066; G06F 9/5072; G06F 9/5083; G06F 17/30194; G06F 17/30545; G06F 17/30572; G06F 17/30598; G06F 9/4893
USPC .......................... 707/714, 717, 736, 740, 825; 718/102–106; 709/203–206; 717/101
See application file for complete search history.

(56) References Cited

U.S. PATENT DOCUMENTS

| | | | |
|---|---|---|---|
| 2001/0054032 A1* | 12/2001 | Goldman et al. | 706/12 |
| 2009/0086254 A1* | 4/2009 | Duong | 358/1.15 |
| 2011/0066894 A1 | 3/2011 | Berlyant et al. | |
| 2011/0093852 A1 | 4/2011 | Li et al. | |
| 2011/0191361 A1 | 8/2011 | Gupta et al. | |
| 2011/0225584 A1 | 9/2011 | Andrade et al. | |
| 2012/0131591 A1* | 5/2012 | Moorthi et al. | 718/104 |
| 2012/0174110 A1* | 7/2012 | Hildrum et al. | 718/102 |
| 2013/0097593 A1* | 4/2013 | Ravi et al. | 717/158 |

(Continued)

OTHER PUBLICATIONS

Babu et al in ACM 2010, "Towards Automatic Optimization of MapReduce programs".*

(Continued)

*Primary Examiner* — Wing F Chan
*Assistant Examiner* — Raji Krishnan
(74) *Attorney, Agent, or Firm* — Stephen R. Tkacs; Stephen J. Walder, Jr.; William J. Stock (57) ABSTRACT

A mechanism is provided in a data processing system for optimization of a distributed file system by log data analysis. A name node in the distributed file system initiates a log analysis map/reduce job on one or more connected data nodes via a map/reduce processing framework in the distributed file system and receives result data resulting from the log analysis map/reduce job from the one or more connected data nodes via the map/reduce processing framework in the distributed file system. The name node performs analysis on the received result data and generates an optimization plan for the one or more connected data nodes based on results of the analysis. The name node initiates the optimization plan on the one or more connected data nodes via the map/reduce processing framework in the distributed file system.

15 Claims, 4 Drawing Sheets

(56) References Cited

U.S. PATENT DOCUMENTS

2013/0254196 A1* 9/2013 Babu et al. .................... 707/736
2014/0026111 A1* 1/2014 Stitt et al. ..................... 717/101

OTHER PUBLICATIONS

Kambatla in HotCloud'09, 2009, "Towards Optimizing Hadoop Provisioning in the Cloud".*

Lipcon in Cloudera blog, Dec. 17, 2009, "7 Tips for improving MapReduce".*

"No One (Cluster) Size Fits All: Automatic Cluster Sizing for Data-intensive Analytics" by Herodotou et al SOCC'11 Oct. 2011.*

"Profiling, Whatif Analysis, and Cost-based Optimization of MapReduce Programs" by Herodotou et al VLDB' 2011 Aug.-Sep. 2011.*

Bhadkamkar, Medha et al., "BORG: Block-reORGanization for Self-optimizing Storage Systems", USENIX Association, 7th USENIX Conference on File and Storage Technologies, San Francisco, California, Feb. 24-27, 2009, pp. 183-196.

Boulon, Jerome et al., "Chukwa: A large-scale monitoring system", in Cloud Computing and its Applications (CCA '08), Chicago, Illinois, Oct. 2008, pp. 1-5.

Chen, Qu et al., "Investigation of Map-reduce Performance on Hadoop", Department of Computer Science, University of Waterloo, http://www.cs.uwaterloo.ca/~q35chen/hadoop_performance.pdf, retrieved Jan. 17, 2012, 10 pages.

Huang, Dachuan et al., "MR-Scope: A Real-Time Tracing Tool for MapReduce", ACM MapReduce'10, Chicago, Illinois, Jun. 23-25, 2010, 7 pages.

Li, Zhenmin et al., "C-Miner: Mining Block Correlations in Storage Systems", Proceedings of the 3rd Symposium on File and Storage Technologies (FAST'04), 2004, pp. 173-186.

Rabkin, Ariel et al., "Chukwa: A system for reliable large-scale log collection", 24th Large Installation System Administration Conference (LISA'10), USENIX Association, 2010, pp. 1-15.

Wang, Guanying et al., "A Simulation Approach to Evaluating Design Decisions in MapReduce Setups", In Proc. IEEE/ACM MASCOTS, Imperial College, London, UK, Sep. 2009, 11 pages.

* cited by examiner

FILE SYSTEM OPTIMIZATION BY LOG/METADATA ANALYSIS

BACKGROUND

The present application relates generally to an improved data processing apparatus and method and more specifically to mechanisms for file system optimization by log/metadata analysis.

A distributed file system or network file system is any file system that allows access to files from multiple hosts sharing via a computer network. This makes it possible for multiple users on multiple machines to share files and storage resources. Distributed file systems may include facilities for transparent replication and fault tolerance. That is, when a limited number of nodes in a file system go offline, the system continues to work without any data loss.

Map/reduce is a software framework to support distributed computing on large data sets on clusters of computers. The framework is inspired by the map and reduce functions commonly used in functional programming, although their purpose in the map/reduce framework is not the same as their original forms.

Map/reduce is a framework for processing highly distributable problems across huge datasets using a large number of computers (nodes), collectively referred to as a cluster (if all nodes use the same hardware) grid (if the nodes use different hardware). Computational processing can occur on data stored either in a file system (unstructured) or in a database (structured).

Map step: The master node takes the input, partitions it up into smaller sub-problems, and distributes them to worker nodes. A worker node may do this again in turn, leading to a multi-level tree structure. The worker node processes the smaller problem, and passes the answer back to its master node. Alternatively, the worker node may pass the answer to a worker node responsible for performing the reduce step.

Reduce step: The master node, or a worker node responsible for performing the reduce step, then collects the answers to all the sub-problems and combines them in some way to form the output the answer to the problem it was originally trying to solve.

Map/reduce allows for distributed processing of the map and reduction operations. Provided each mapping operation is independent of the others, all maps can be performed in parallel though in practice it is limited by the number of independent data sources and/or the number of CPUs near each source. Similarly, a set of "reducers" can perform the reduction phase—provided all outputs of the map operation that share the same key are presented to the same reducer at the same time. While this process can often appear inefficient compared to algorithms that are more sequential, Map/reduce can be applied to significantly larger datasets than "commodity" servers can handle a large server farm can use Map/reduce to sort a petabyte of data in only a few hours. The parallelism also offers some possibility of recovering from partial failure of servers or storage during the operation: if one mapper or reducer fails, the work can be rescheduled—assuming the input data is still available.

SUMMARY

In one illustrative embodiment, a method, in a data processing system, is provided for optimization of a distributed file system by log data analysis. The method comprises a name node in the distributed file system initiating a log analysis map/reduce job on one or more connected data nodes via a map/reduce processing framework in the distributed file system and receiving result data resulting from the log analysis map/reduce job from the one or more connected data nodes via the map/reduce processing framework in the distributed file system. The method further comprises the name node performing analysis on the received result data and generating an optimization plan for the one or more connected data nodes based on results of the analysis. The method further comprises the name node initiating the optimization plan on the one or more connected data nodes via the map/reduce processing framework in the distributed file system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Distributed file systems and other map/reduce file systems distribute data and centralize basic metadata, such as information about the chunk layout. However, existing distributed file systems do not provide centralized knowledge about how the data are being used on each data node. Decisions about where and how data are stored is made with a static view of the entire file system at the time the data are stored.

As an example, a file system may have a "palette" of five text analytics algorithms that accomplish the same end goal installed on each data node. One does not know which algorithm will work the best over some extended usage period for a variety of data. When one runs a query on the data node, one may use any one of the five algorithms; however, there is no automated way in which to decide which algorithm is best in the prior art. One must manually decide over and over again as the data on which one is operating changes.

The illustrative embodiments provide a mechanism for utilizing map/reduce mechanisms to accomplish map/reduce file system analysis and optimization. Logs reside on computation nodes. The mechanism uses rich, localized logs about the usage of local data node data to improve overall performance in the optimization step of the map/reduce framework. The mechanism leverages a framework that is already in place to optimize the framework itself.

Thus, given the same palette of five text analytics algorithms, when a query is run on a data node, the mechanism of the illustrative embodiments fire multiple algorithms and test the algorithms for "success." The mechanisms also track the algorithms for the speed at which success is achieved, or some other metric, in the log file. Over some period of time, the mechanism mines these log files across all data nodes to determine a good-to-worst ordering of the five algorithms and optimizes the system by restricting the data nodes to only use the best performing of the algorithms for better overall system performance.

Figure 1:
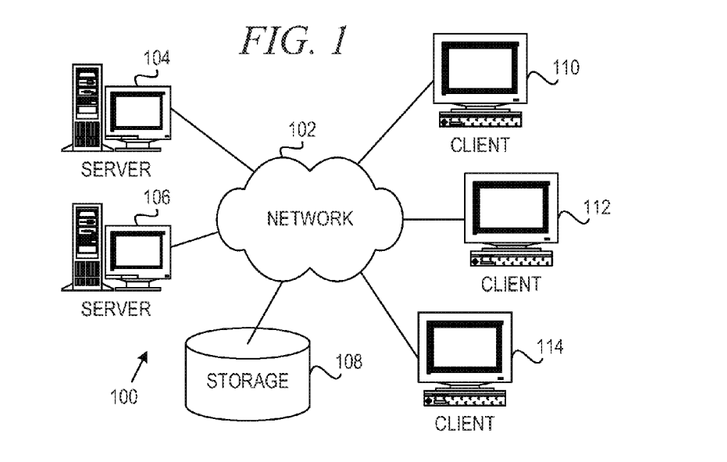
FIG. 1 depicts a pictorial representation of an example distributed data processing system in which aspects of the illustrative embodiments may be implemented.
Figure 2:
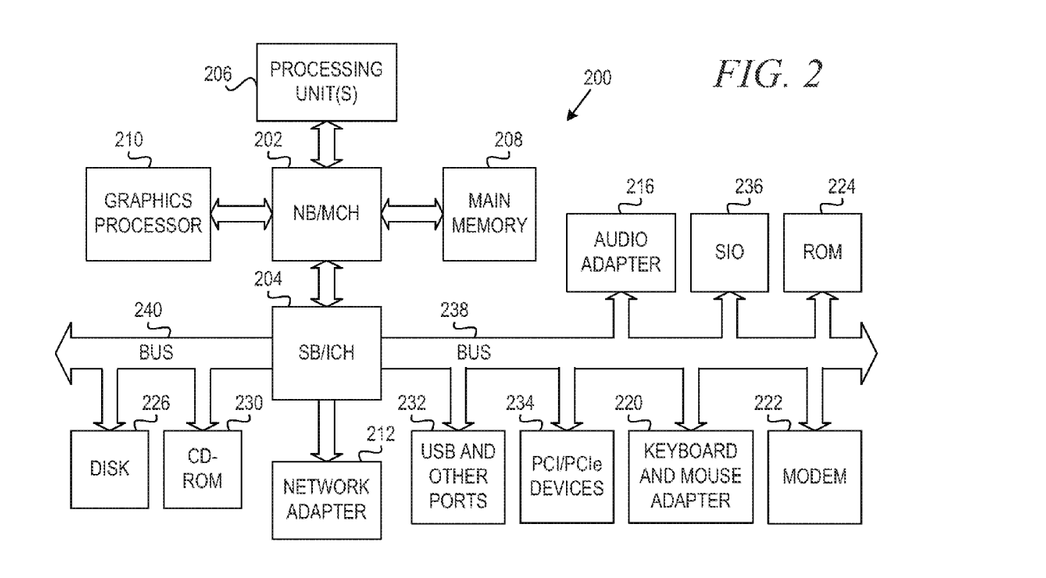
FIG. 2 is a Hock diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServe™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SNIP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, RUM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
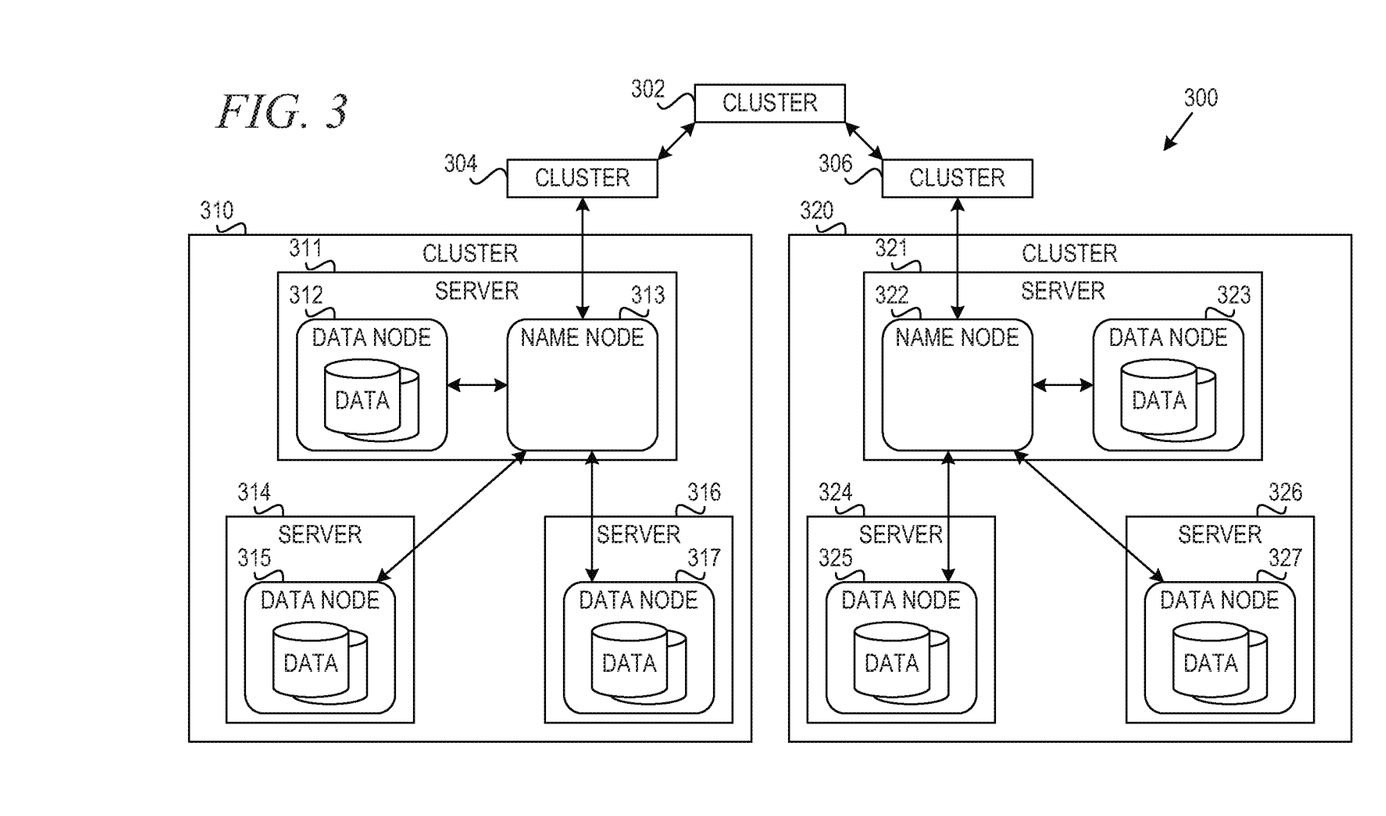
FIG. 3 illustrates nodes in a distributed file system in which aspects of the illustrative embodiments may be implemented.

FIG. 3 illustrates nodes in a distributed file system in which aspects of the illustrative embodiments may be implemented. Distributed file system 300 connects nodes, which may be personal computers, contained within clusters over which data files are distributed. Distributed file system 300 provides access to and stores the data files as one seamless file system. Distributed file system 300 handles access to data files in a streaming manner, meaning that applications or commands are executed directly using the map/reduce processing model.

Distributed file system 300 comprises of interconnected clusters 302, 304, 306, 310, 320 of nodes where files and directories reside. A cluster consists of a single node, known as a name node, which manages the file system namespace and regulates client access to files. In one example embodiment, the name node may have replicas for redundancy. In addition, data nodes store data as blocks within files. For example, cluster 310 comprises servers 311, 314, and 316. Server 311 stores name node 313 and data node 312. Server 314 stores data node 315, and server 316 stores data node 317. Name node 313 manages the file system namespace of cluster 310 and regulates client access to files in data nodes 312, 315, and 317. The data node is a server. The name node and data node may be the same server or may be separate servers. Similarly, cluster 320 comprises servers 321, 324, and 326. Server 321 stores name node 322 and data node 323. Server 324 stores data node 325, and server 326 stores data node 327. Name node 322 manages the file system namespace of cluster 320 and regulates client access to files in data nodes 323, 325, and 327.

Name nodes and data nodes are software components designed to run in a decoupled manner on commodity machines across heterogeneous operating systems. Distributed file system 300 may be built using the Java™ programming language; therefore, any machine that supports the Java™ programming language may run the distributed file system. A typical installation cluster may have a dedicated machine that runs a name node and possibly one data node. Each of the other machines in the cluster may run one data node.

The communication protocols for distributed file system 300 may build on the TCP/IP protocol. Clients may connect to a Transmission Control Protocol (TCP) port opened on the name node, and then communicate with the name node using a proprietary Remote Procedure Call (RPC)-based protocol. Data nodes talk to the name node using a proprietary block-based protocol.

Distributed file system 300 may not always place data blocks uniformly across data nodes, meaning the used space for one or more data nodes can be underutilized. Therefore, distributed file system 300 supports rebalancing data blocks using various models. One model may move data blocks from one data node to another automatically if the free space on a data node falls too low. Another model may dynamically create additional replicas and rebalance other data blocks in a cluster if a sudden increase in demand for a given file occurs. Distributed file sys 300 may also provide balance command for manual rebalancing tasks.

One common reason to rebalance is the addition of new data nodes to a cluster. When placing new blocks, name nodes consider various parameters before choosing the data nodes to receive them. Some of the considerations are: block-replica writing policies, prevention of data loss due to installation or rack failure, reduction of cross-installation network I/O, and uniform data spread across data nodes in a cluster.

In accordance with an illustrative embodiment, a mechanism is provided to leverage the map/reduce framework to accomplish map/reduce file system analysis and optimization, because logs reside on computation nodes. Using rich, localized logs about the usage of local data, the mechanism improves overall performance of the map/reduce processing model. The mechanism of the illustrative embodiment optimizes file system placement of and access to data in a parallel, distributed storage environment by performing data mining on usage logs to predict actions to improve performance. The mechanism uses predictions (analytics), rather than just reacting to how data have been used. The optimization is executed as a map/reduce job as the metadata and logs are distributed across the data nodes. The mechanism may perform optimization within a region of the file system (intra-data node), by a user or accessing program, or globally (inter-data node). The mechanism may move jobs to a particular computer for optimization or, alternatively, may move data to a computer running a particular job.

Figure 4:
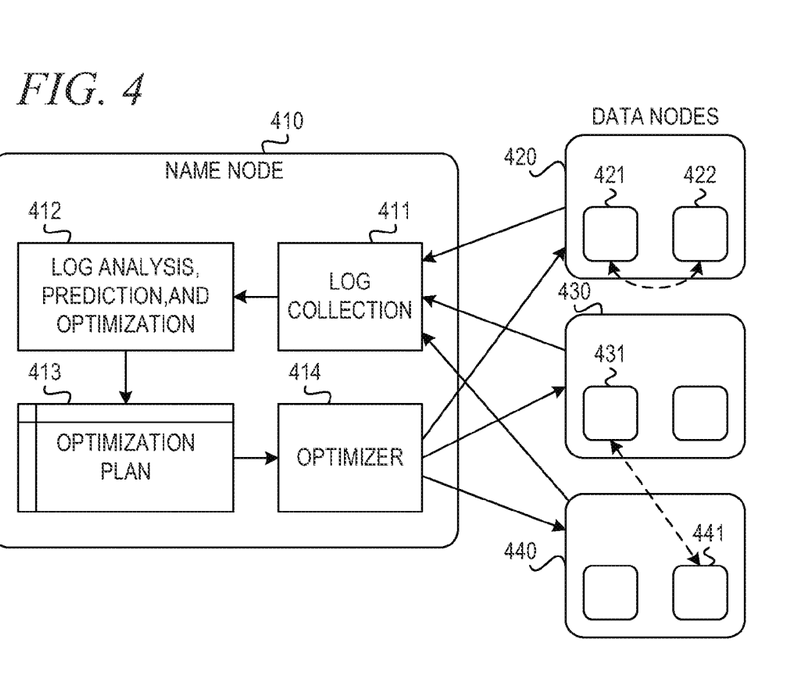
FIG. 4 is a block diagram illustrating a parallel, distributed file system with file system optimization by log analysis in accordance with an illustrative embodiment.

FIG. 4 is a block diagram illustrating a parallel, distributed file system with file system optimization by log analysis in accordance with an illustrative embodiment. Name node 410 regulates client access to files in data nodes 420, 430, and 440. Name node 410 comprises log collection component 411, which collects log data from data nodes 420, 430, and 440.

Name node 410 also comprises log analysis, prediction, and optimization component 412, which performs log analysis to mine for patterns in the log data. Log analysis, prediction, and optimization component 412 uses identified patterns to propose placement, organization, and configuration of algorithms and data in data nodes 420, 430, and 440 by generating optimization plan 413. Name node 410 also comprises optimizer 414, which initiates jobs on data nodes 420, 430, and 440 according to optimization plan 413. Name node 410 collects tog data and initiates jobs on data nodes 420, 430, and 440 by leveraging the map/reduce framework of the parallel, distributed file system.

In one illustrative embodiment, name node 410 initiates on data nodes 420, 430, 440 algorithms that achieve the same goal. Data nodes 420, 430, 440 store logs that result from running the algorithms. Log collection component 411 collects the logs from data nodes 420, 430, 440. Log analysis, prediction, and optimization component 412 analyzes the togs to mine for patterns and uses identified patterns to predict which algorithms will work best on which data nodes. Log analysis, prediction, and optimization component 412 generates optimization plan 413. Optimization component 414 initiates algorithms on data nodes 420, 430, 440 according to optimization plan 413.

The map/reduce framework may result in data being moved within or between data nodes 420, 430, 440 for data block rebalancing. For example, data node 420 may move data block 421 from local disk storage to cloud storage and may move data block 422 from cloud storage to local disk storage. Data node 430 may move data block 431 to data node 440, and data node 440 may move data block 441 to data node 430. Data placement may affect performance of the map/reduce processing model. In one example embodiment, tog analysis, prediction, and optimization component 412 may propose configuration to optimize performance of the map/reduce processing framework based on data placement. In another example embodiment, log analysis, prediction, and optimization component 412 may propose data placement, organization, and configuration for optimal performance. For instance, algorithms on data nodes 430 and 440 may perform better if data block 441 were on data node 430 and data block 431 were on data node 440.

Thus, the mechanisms of the illustrative embodiments are capable of many optimization options. The mechanisms of the illustrative embodiments use the map/reduce framework and the decentralized data usage logs to determine and initiate desired system optimization.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROW, an erasable programmable read-only memory (EPROM or Flash memory), an optical fiber, a portable compact disc read-only memory (CDROM), an optical storage device, a magnetic storage device, or any suitable combination of the foregoing in the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or Hock diagrams, and combinations of blocks in the flowchart illustrations and/or Hock diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart, and/or block diagram block or blocks.

Figure 5:
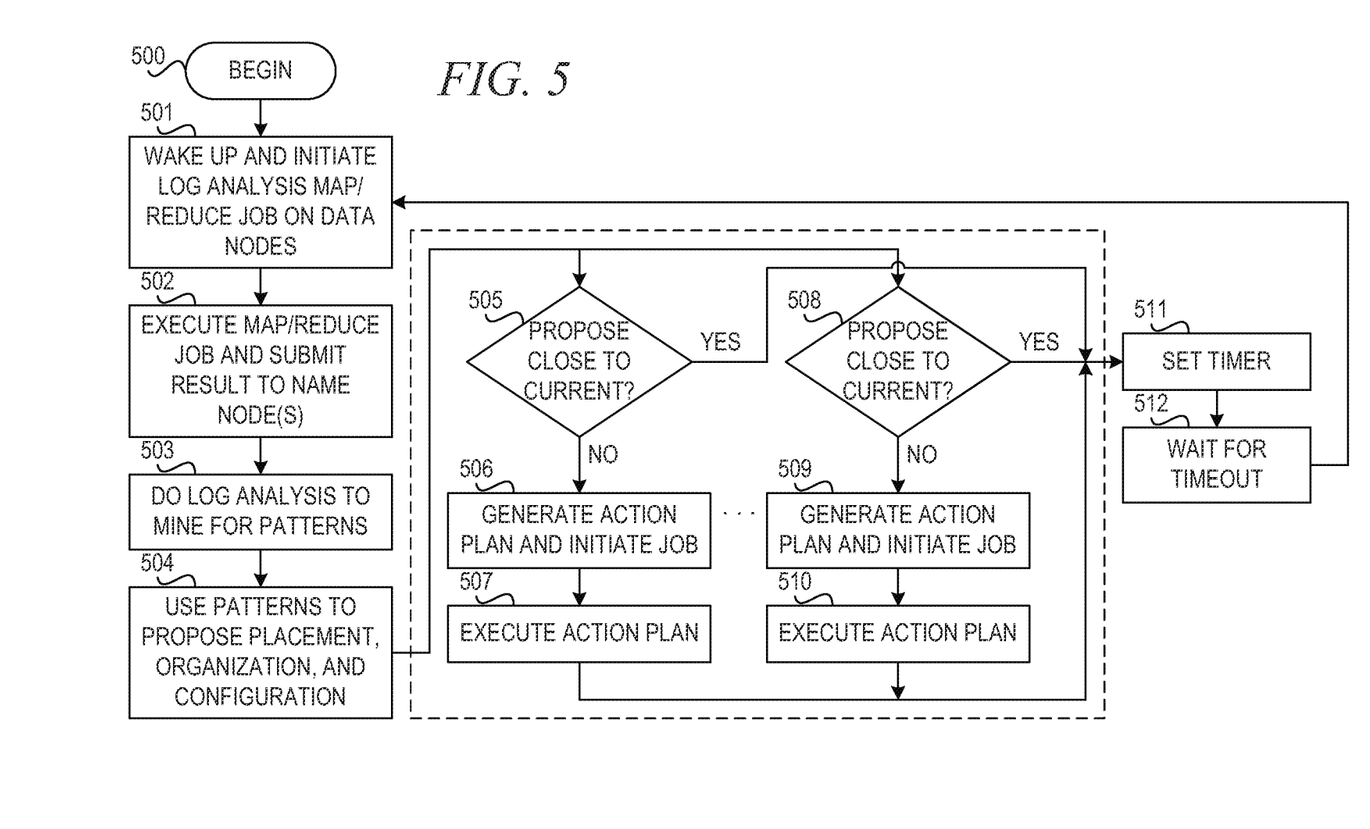
FIG. 5 is a flowchart illustrating operation of file system optimization by log/metadata analysis in accordance with an illustrative embodiment.

FIG. 5 is a flowchart illustrating operation of file system optimization by log/metadata analysis in accordance with an illustrative embodiment. Operation begins in block 500, and a name node wakes up and initiates a log analysis map/reduce job on connected data nodes (block 501). The data nodes execute the map/reduce job and submit results to the name node (block 502). An analysis component of the name node performs log analysis to mine for patterns (block 503). The analysis component of the name node uses identified patterns to propose placement, organization, and configuration of data and algorithms on the data nodes (block 504).

FIG. 5 shows that there are a number of optimization possibilities that are available to check against, and then all data nodes execute the action plan map job relevant to them in parallel. For a first data node connected to the name node, the analysis component determines whether the proposed placement, organization, and configuration are close to the current placement, organization, and configuration of the data node (block 505). If the proposed optimization is not close to the current configuration of the data node in block 505, the analysis component of the name node generates an action plan for the data node and initiates the action plan on the data node (block 506). The data node executes the action plan (block 507). Thereafter, or if the proposed optimization is close to the current configuration of the data node in block 505, operation proceeds to block 511 to set a timer.

For another data node connected to the name node, the analysis component determines whether the proposed placement, organization, and configuration are dose to the current placement, organization, and configuration of the data node (block 508). If the proposed optimization is not close to the current configuration of the data node in block 508, the analysis component of the name node generates an action plan for the data node and initiates the action plan on the data node (block 509). The data node executes the action plan (block 510). Thereafter, or if the proposed optimization is close to the current configuration of the data node in block 508, operation proceeds to block 511 to set a timer.

The operations of blocks 505-507 or blocks 508-510 are performed for each data node connected to the name node. Thereafter, the name node sets a timer (block 511) and waits for the timer to expire (timeout) (block 512). Then, operation returns to block 501 to wake up and initiate the log analysis map/reduce job on the data nodes. Thus, the name nodes in the distributed file system periodically perform placement, optimization, and configuration, if desired, to optimize performance of the distributed file system map/reduce processing model. The operations illustrated in FIG. 5 may be performed by all name nodes in the distributed file system.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for utilizing map/reduce mechanisms to accomplish map/reduce file system analysis and optimization. The mechanism uses rich, localized logs about the usage of local data node data to improve overall performance in the optimization step of the map/reduce framework. The mechanism leverages a framework that is already in place to optimize the framework itself.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimization of a map/reduce distributed file system by log data analysis, the method comprising:

initiating, by a name node in the distributed file system, a log analysis map/reduce job on one or more connected data nodes via a map/reduce processing framework in the distributed file system, wherein initiating a log analysis map/reduce job on the one or more connected data nodes comprises initiating a plurality of algorithms to run on the one or more connected data nodes, wherein the plurality of algorithms accomplish the same goal installed on each of the one or more connected data nodes;

receiving, by the name node, result data resulting from the log analysis map/reduce job from the one or more connected data nodes via the map/reduce processing framework in the distributed file system;

performing, by the name node, analysis on the received result data, wherein performing analysis on the received result data comprises performing data mining on the received result data to identify patterns to predict which algorithms among the plurality of algorithms have a best performance on each given data node or across data nodes within the one or more connected data nodes;

generating, by the name node, an optimization plan for the one or more connected data nodes based on results of the analysis and using the identified patterns, wherein generating the optimization plan comprises configuring each given data node within the one or more connected data nodes to use its corresponding predicted algorithm; and initiating, by the name node, the optimization plan on the one or more connected data nodes via the map/reduce processing framework in the distributed file system.

2. The method of claim 1, wherein generating the optimization plan further comprises using the identified patterns to propose data block placement, organization, or configuration changes to the one or more connected data nodes.

3. The method of claim 1, wherein performing analysis further comprises analyzing the received result data based on data block placement among the one or more connected data nodes.

4. The method of claim 1, wherein generating the optimization plan further comprises proposing data block placement to optimize performance of the map/reduce processing framework in the distributed file system.

5. The method of claim 1, further comprising:
setting a timer; and
responsive to expiration of the timer, repeating initiating the log analysis map/reduce job on one or more connected data nodes, receiving result data resulting from the log analysis map/reduce job from the one or more connected data nodes, performing analysis on the received result data, generating an optimization plan for the one or more connected data nodes based on results of the analysis, and initiating the optimization plan on the one or more connected data nodes via the map/reduce processing framework in the distributed file system.

6. A computer program product comprising a non-transitory computer readable storage medium having a computer readable program stored therein, wherein the computer readable program, when executed on a name node computing device of a distributed file system, causes the name node computing device to:

initiate a log analysis map/reduce job on one or more connected data nodes via a map/reduce processing framework in the distributed file system, wherein initiating a log analysis map/reduce job on the one or more connected data nodes comprises initiating a plurality of algorithms to run on the one or more connected data nodes, wherein the plurality of algorithms accomplish the same goal installed on each of the one or more connected data nodes;

receive result data resulting from the log analysis map/reduce job from the one or more connected data nodes via the map/reduce processing framework in the distributed file system;

perform analysis on the received result data, wherein performing analysis on the received result data comprises performing data mining on the received result data to identify patterns to predict which algorithms among the plurality of algorithms have a best performance on each given data node or across data nodes within the one or more connected data nodes;

generate an optimization plan for the one or more connected data nodes based on results of the analysis and using the identified patterns, wherein generating the optimization plan comprises configuring each given data node within the one or more connected data nodes to use its corresponding predicted algorithm; and initiate the optimization plan on the one or more connected data nodes via the map/reduce processing framework in the distributed file system.

7. The computer program product of claim 6, wherein generating the optimization plan further comprises using the identified patterns to propose data block placement, organization, or configuration changes to the one or more connected data nodes.

8. The computer program product of claim 6, wherein performing analysis further comprises analyzing the received result data based on data block placement among the one or more connected data nodes.

9. The computer program product of claim 6, wherein generating the optimization plan further comprises proposing data block placement to optimize performance of the map/reduce processing framework in the distributed file system.

10. The computer program product of claim 6, wherein the computer readable program further causes the name node computing device to:

set a timer; and
responsive to expiration of the timer, repeating initiating the log analysis map/reduce job on one or more connected data nodes, receive result data resulting from the log analysis map/reduce job from the one or more connected data nodes, perform analysis on the received result data, generate an optimization plan for the one or more connected data nodes based on results of the analysis, and initiate the optimization plan on the one or more connected data nodes via the map/reduce processing framework in the distributed file system.

11. An apparatus, comprising:
a processor; and
a memory coupled to the processor, wherein the memory comprises instructions which, when executed by the processor, cause the processor to:

initiate a log analysis map/reduce job on one or more connected data nodes via a map/reduce processing framework in the distributed file system, wherein initiating a log analysis map/reduce job on the one or more connected data nodes comprises initiating a plurality of algorithms to run on the one or more connected data nodes, wherein the plurality of algorithms accomplish the same goal installed on each of the one or more connected data nodes;

receive result data resulting from the log analysis map/reduce job from the one or more connected data nodes via the map/reduce processing framework in the distributed file system;

perform analysis on the received result data, wherein performing analysis on the received result data comprises performing data mining on the received result data to identify patterns to predict which algorithms among the plurality of algorithms have a best performance on each given data node or across data nodes within the one or more connected data nodes;

generate an optimization plan for the one or more connected data nodes based on results of the analysis and using the identified patterns, wherein generating the optimization plan comprises configuring each given data node within the one or more connected data nodes to use its corresponding predicted algorithm; and initiate the optimization plan on the one or more connected data nodes via the map/reduce processing framework in the distributed file system.

12. The apparatus of claim 11, wherein generating the optimization plan further comprises using the identified patterns to propose data block placement, organization, or configuration changes to the one or more connected data nodes.

13. The apparatus of claim 11, wherein performing analysis further comprises analyzing the received result data based on data block placement among the one or more connected data nodes.

14. The apparatus of claim 11, wherein generating the optimization plan further comprises proposing data block placement to optimize performance of the map/reduce processing framework in the distributed file system.

15. The apparatus of claim 11, wherein the instructions further cause the processor to:

set a timer; and responsive to expiration of the timer, repeating initiating the log analysis map/reduce job on one or more connected data nodes, receive result data resulting from the log analysis map/reduce job from the one or more connected data nodes, perform analysis on the received result data, generate an optimization plan for the one or more connected data nodes based on results of the analysis, and initiate the optimization plan on the one or more connected data nodes via the map/reduce processing framework in the distributed file system.

* * * * *